Oct. 10, 1944.    R. M. EVANS ET AL    2,360,214
SENSITIZING IN COLOR PHOTOGRAPHY
Filed March 4, 1943
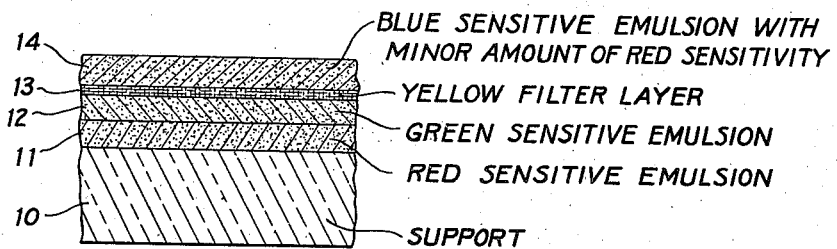
RALPH M. EVANS
WESLEY T. HANSON, JR.
INVENTORS Patented Oct. 10, 1944

2,360,214

UNITED STATES PATENT OFFICE 2,360,214

SENSITIZING IN COLOR PHOTOGRAPHY

Ralph M. Evans and Wesley T. Hanson, Jr., Rochester, N. Y., assignors to Eastman Kodak Company, Rochester, N. Y., a corporation of New Jersey Application March 4, 1943, Serial No. 477,964

5 Claims. (Cl. 95—2)

This invention relates to color photography and more particularly to a method of improving the color sensitizing in color photography.

The first requirement of a multi-color process is that the gray scale be balanced—that is, that the neutrals be reproduced as neutral. To accomplish this result, the dyes or inks employed in the picture or print must be balanced so that a gray scale can be reproduced, including the reproduction of white as white.

It is well known that when equal amounts of the yellow and magenta dyes or inks available for the subtractive method of color photography are mixed, an orange is the result rather than a red. Thus, when the gray scale is balanced, the image produced from a red is actually orange, and not red.

It is, therefore, the principal object of this invention to provide a method for improvement of the color rendition in a subtractive color process. A further object is to provide a method for improving the reproduction of colors which have a yellow component.

These objects are accomplished in a color process employing elements sensitive to the blue, green, and red spectral regions, by extending the sensitivity of the blue-sensitive element into the red region of the spectrum so that the effective red sensitivity is $\frac{1}{10}$ to $\frac{1}{100}$ of the blue sensitivity.

In the accompanying drawing, the single figure is a sectional view of a multi-layer material sensitized according to our invention.

In carrying out our invention, a blue-sensitive photographic emulsion of the gelatino-silver bromide or bromoiodide type is sensitized to red light by mixing with it an optical sensitizing dye producing such sensitivity. The emulsion is then coated, either as part of a multi-layer material with green sensitive and red-sensitive emulsion layers, or on a separate support for the preparation of separation images.

A suitable material is illustrated in the accompanying drawing, in which a support 10 is coated with emulsion layers 11 and 12, sensitive, respectively, to the red and green regions of the spectrum, and a yellow filter layer 13 over layer 12. The outer layer 14 is a blue-sensitive emulsion layer which has a conferred sensitivity in the red region in the amount of about $\frac{1}{10}$ to $\frac{1}{100}$ of its blue sensitivity.

In the preparation of the emulsions according to our invention, we prefer to use a red sensitizer which confers little or no green sensitivity, although sensitizing in both the green and the red regions can be employed. The sensitizing is preferably such that images of the same contrast are produced by exposure to red light and to blue light, although the sensitizing may be such that the contrast when exposed by light other than blue, is much lower than the contrast produced by blue light.

Our invention will not be described by reference to the following examples, which are illustrative only.

Example 1

To 1000 grams of a fine-grain gelatino-silver bromide negative emulsion sensitive only to blue light and containing about 40 grams of silver bromide there was added 0.4 mg. of 2,2'-diethyl-5,6,5',6'-dibenzoxadicarbocyanine, with stirring. This produced an emulsion sensitive to blue and red light without any appreciable green sensitivity. The red light sensitivity was approximately $\frac{1}{20}$ of the blue light sensitivity. The emulsion was coated as the top layer of a multi-layer element.

Example 2

To 1000 grams of a gelatino-silver bromide emulsion similar to that of Example 1 there was added 0.6 mg. of 2,2'-diethylthia-4'-dicarbocyanine iodide, with stirring. This produced an emulsion having blue and red sensitivity with no appreciable green sensitivity. The emulsion was coated as in Example 1.

In Examples 1 and 2 the contrast of the emulsion to red light was substantially the same as the contrast to blue light. In the following example, the contrast to red light is much lower than the contrast to blue light.

Example 3

1000 grams of a fine-grain, silver bromide negative emulsion sensitive only to blue light was divided into two portions of approximately 250 grams and 750 grams. The 250 gram portion was sensitized to red light with 0.75 to 1.25 mgs. of 3,3'-diethyl-5,6,5',6'-dibenzthiacarbocyanine bromide. This portion of the emulsion was held for about 10 minutes at 45° to 50° C., and was then mixed with the remaining 750 gram portion of the emulsion. This produces an emulsion having much less red sensitivity than blue sensitivity, and also lower contrast when exposed to red light than when exposed to blue light.

Upon exposure of a multi-layer element such as that described in Example 1, the top emulsion layer records the blue light of the image, and also records some of the red light, if any red light is present. The red component is recorded in the bottom emulsion layer in the usual way, but, in addition, some red light is recorded in the top emulsion layer. If a positive red component image is produced in the bottom layer, a positive image representing part of the red light is also produced in the top layer, rather than a negative as in the case of masking. Loss of yellow dye in the top layer is, therefore, brought about, and in order to maintain the neutrals of the image, the sensitivity of the top layer to blue light must be decreased by an amount equal to the red sensitivity of that layer. This is usually an easy matter, since the red sensitivity is very low when compared with the blue sensitivity.

The result of the minor amount of red sensitivity in the blue-sensitive emulsion is an automatic improvement of the reds in the picture. Reds are brighter and less orange than they are with the usual sensitizing.

While we have described our invention in connection with a multi-layer material, it may also be employed in the production of color separation images.

We claim:

1. The method of improving the color rendition of a multi-layer photographic material having silver halide emulsion layers sensitive to each of the three primary colors, in which subtractive dye images are formed, the combination of yellow and magenta in equal amounts being too orange, which comprises sensitizing the blue-sensitive layer to red light in an amount approximately $1/10$ to $1/100$ of its blue light sensitivity.

2. The method of improving the color rendition of a multi-layer photographic material having superposed red-, green-, and blue-sensitive gelatino-silver halide emulsion layers, in which subtractive dye images are formed, the combination of yellow and magenta in equal amounts being too orange, which comprises sensitizing the blue-sensitive silver halide layer to red light in an amount approximately $1/10$ to $1/100$ of its blue light sensitivity.

3. The method of improving color reproduction in a three-color photographic process employing gelatino-silver halide emulsion layers separately sensitive to the red, green, and blue spectral regions, in which subtractive dye images are formed, the combination of yellow and magenta in equal amounts being too orange, which comprises extending the sensitivity of the blue-sensitive emulsion into the red spectral region by an amount from $1/10$ to $1/100$ of the blue light sensitivity of that emulsion, and recording in said emulsion the blue component and that amount of the red component by which the layer is sensitive to red light.

4. A multi-layer photographic element comprising superposed gelatino-silver halide emulsion layers separately sensitive to the red, green, and blue spectral regions, in which subtractive dye images are formed, the combination of yellow and magenta in equal amounts being too orange, said blue-sensitive emulsion being also sensitive to the red spectral region in an amount $1/10$ to $1/100$ of the blue light sensitivity.

5. The method of improving the rendition of red light in a photographic color process employing at least a blue-sensitive silver halide emulsion and a green-sensitive silver halide emulsion, which comprises sensitizing the blue-sensitive silver halide emulsion to red light in an amount approximately $1/10$ to $1/100$ of its blue light sensitivity, exposing said emulsions to blue and green light, and forming a yellow dye image in said blue-sensitive emulsion, and a magenta image in said green-sensitive emulsion, the combination of the yellow and magenta in equal amounts being too orange in the absence of said red light sensitivity.

RALPH M. EVANS.
WESLEY T. HANSON, JR.